2 Sheets—Sheet 1.
S. NORRIS.
Car Truck.
No. 856. Reissued Nov. 22, 1859.
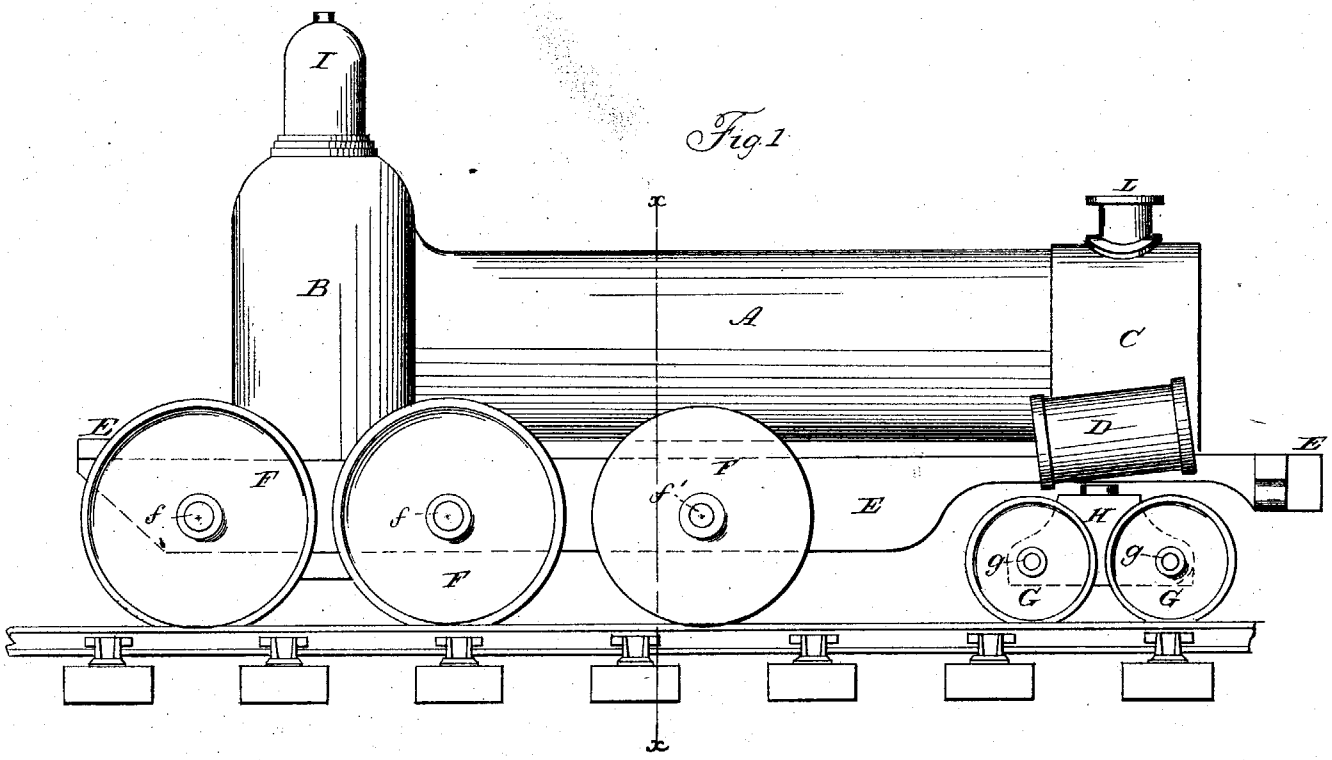
Witnesses.
A. Norris
L. L. Murray
Inventor.
Septimus Norris
N. PETERS, PHOTO-LITHOGRAPHER, WASHINGTON, D. C.

2 Sheets—Sheet 2
S. NORRIS.
Car Truck.
No. 856. Reissued Nov. 22, 1859.
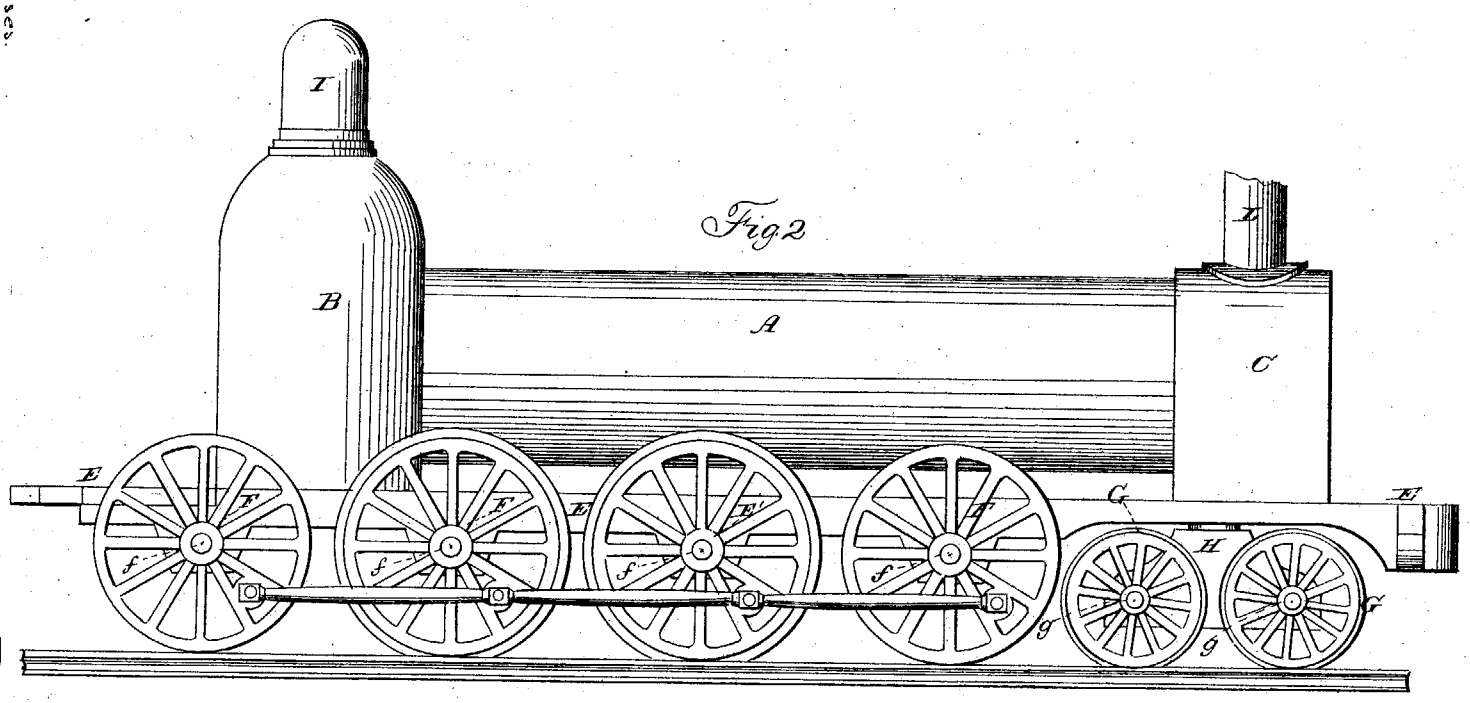
Witnesses.
D Morris
S S Murray
Inventor
Septimus Norris
N. PETERS, PHOTO-LITHOGRAPHER, WASHINGTON, D. C.

UNITED STATES PATENT OFFICE.

SEPTIMUS NORRIS, OF PHILADELPHIA, PENNSYLVANIA.

IMPROVEMENT IN RUNNING-GEAR OF LOCOMOTIVE-ENGINES.

Specification forming part of Letters Patent No. 11,733, dated September 26, 1854; Reissue No. 534, dated March 2, 1858; Reissue No. 856, dated November 22, 1859.

*To all whom it may concern:*

Be it known that I, SEPTIMUS NORRIS, of Philadelphia, Pennsylvania, have invented an Improvement in Running-Gear of Locomotive-Engines, of which the following is a specification.

My invention relates to the running-gear of locomotives; and it consists of a novel arrangement constituted of six or eight driving-wheels, in combination with a free-vibrating truck formed of one or two pairs of wheels, the driving and guiding wheels being so located relatively to each other that the former shall sustain nearly the whole weight of the engine, as will be hereinafter more fully described, whereby the greatest practicable amount of adhesion is obtained, while the locomotive is capable of curving freely without injury either to itself or to the rails of the road upon which it runs.

In order that those skilled in the art may make and use my invention, I shall proceed to describe its construction and operation, referring by letter to the accompanying drawings, forming part of this specification.

Similar letters in the different views indicate like parts.

Figure 1 represents an elevation of my improvement in connection with a locomotive constituting a ten-wheel engine, and Fig. 2 an elevation of my improvement modified so as to constitute a twelve-wheel locomotive.

In the different views, A represents the boiler, B the fire-box, C the smoke-box, D the cylinder, I the dome, and L the smoke-pipe, of a locomotive, all of which parts may be constructed as desired, and need no minute description here, since they form no part of my invention.

In Fig. 1, E represents the frame of the locomotive, in which the axles *f f* and *f'* have their bearings. F F', &c., are the driving-wheels, four of which (marked F) are shown with flanges, the remaining two (marked F') without flanges. H is the "guiding-truck" frame, which is pivoted to the main frame E, so as to turn readily in a horizontal plane, and which carries the axles *g g* of the four flanged guide-wheels G G, &c. One pair of the drivers F is placed behind the fire box B, another pair F in front of the fire-box, and another pair, F', as near as practicable to the truck H, and some distance in advance of the center of gravity of the entire engine. The truck H is situated nearly or immediately under the smoke-box and cylinders. In the figure to which I am now referring it is located nearly under the cylinders. The red line Z Z is supposed to pass through the center of gravity of the locomotive.

In Fig. 2, E represents the frame-work of the engine, carrying the axles *f f* and *f' f'* of the eight drivers F F', &c., of which the foremost and hindmost pairs (marked F) are represented as having no flanges. H is the vibrating guiding-truck, which is pivoted to the frame E, and here shown as being located immediately under the cylinders and smoke-box, which location I believe to be most advantageous, and propose to adopt. Said truck carries the four flanged truck-wheels G G, &c., as described, of the truck in Figs. 1 and 2.

In Fig. 5, (as in the other figures,) E represents the frame; F F', &c., the eight driving-wheels, those marked F having no flanges. H is the vibrating guiding-truck, which is here shown as being located partially under the cylinders and smoke-box, and having only one pair of wheels. I do not wish to limit myself to any particular construction in detail, and therefore give no description of any.

I have found it most desirable in practice to construct my improved running-gear for locomotives with ten wheels, six of which are drivers and the other four with their frame to constitute a "free-vibrating truck," which is pivoted to the main frame and sustains little (or no) weight, acting simply as a pilot or guide. The drivers are connected and the power applied to the middle pair, though it may be applied to either of the other pairs. I also propose to place the guiding-truck immediately under the cylinders and smoke-box, as shown at Fig. 1, so that there shall be no overhanging weight and one pair of drivers behind the fire-box, to avoid overhanging weight at that end of the locomotive, another pair in front of the fire-box and back of the center of gravity of the engine, and another pair in advance of the center of gravity of the entire engine and as near to the guiding-truck as practicable, so that the latter shall sustain little or no weight.

Though I do not confine myself to any particular number of flanged wheels or to flanging any particular pair or pairs, I propose to flange only the hindmost pair, since that pair alone, I believe, require to be flanged, while others may be flanged without altering the principal feature of my improvement.

The construction of my improvement with ten wheels—six drivers and four guiding-wheels—in a vibrating truck, arranged as above described, having flanges only upon the last pair of drivers and upon all the guiding-wheels, I consider the most advantageous arrangement; but I wish to be understood as having shown various modifications, not because I consider them equally practical and advantageous with the ten-wheel arrangement as just described, but because I wish to make known my knowledge of the various modifications to which my improvement is liable without changing its main features—viz., distribution of the weight upon the rails, so as to obtain the greatest practicable amount of adhesion, while the free-vibrating truck is retained until relieved almost entirely of weight—and to prevent others from availing themselves of the benefits of my improvement by slightly modifying the same under the plea that such modification was unknown to me at the time of my invention.

In explaining the operation of, and the advantages possessed by, my improvement, I would call attention to the arrangements heretofore known and used, show the many objections which have been and can be made to them, and describe the differences between them and my improvement, and the advantages gained by these differences.

The six wheel American engine which Captain Moering in his letter to Messrs. Eastwick & Harrison, (see Franklin Journal, vol. 5, 3d series, p. 15,) denominates "the true offspring of American mechanical talent as possessing a free truck which affords a most opportune facility for turning curves," was, as is well known, subject to two great objections—viz., the concentration of the whole weight of the engine upon a few points upon the rails and a large portion upon one point (under the driver) on each rail, and, further, having only a certain and inadequate proportion of the weight available to obtain adhesion. These objections or disadvantages were partially overcome and the "locomotive rendered vastly more valuable by the addition of another pair of drivers, constituting the eight-wheel engine"—a combination of four drivers (one pair before and the other behind the fire-box) with the four-wheel guiding truck, as patented by H. R. Campbell in 1838. By this arrangement the weight upon the rails at any one point was diminished, while the whole weight upon the drivers or the adhesion of the engine was increased, whereby the engine was rendered capable of performing more work with the same expenditure of power, while it became more durable and less hurtful to the rails. This improvement, and the advantages arising therefrom, very naturally induced practical men and engineers to conclude that the locomotive would be rendered still more valuable and economical if a greater portion or the whole weight of the engine could be thrown upon the drivers. To accomplish this great and desirable result the locomotive was constructed with eight connected driving-wheels, constituting what is known as the "eight-wheel connected engine," and patented by Ross Winans in 1843; but in concentrating the whole weight of the engine upon the drivers, and thus obtaining the maximum amount of adhesion, while at the same time the weight was distributed, the "free-vibrating truck"—the great feature of the American engine—was necessarily abandoned, thus leaving the improvement embodying the great desideratum (the maximum adhesion and distribution of weight) subject to objections which render its value questionable. These objections are, its incapacity to turn readily, and the practical disadvantages arising from the overhanging weight of the fire-box at one end and the cylinders at the other.

In my improvement the weight may be distributed over a greater space without increasing the rigid wheel-base. Nearly the whole weight of the engine is made available for adhesion, and, if deemed expedient, none of the drivers except the hindermost pair need be flanged, in which case the engine would have no rigid wheel-base. I am enabled to extend the wheel-base indefinitely without occasioning any difficulty; hence the engine is made to run more steadily upon the road and the wheels not crowded together so as to make it difficult to get all the parts for repairing. Being furnished with a free-vibrating truck which has little or no weight to sustain, the engine is easily piloted through the curves of the road without injury either to itself or to the rails.

I would remark that though the truck, no matter how near the front of the engine and how close to the front pair of drivers, must sustain some weight, in practice may be considered as nothing, and becomes absolutely so when the engine is pulling upgrade to her full capacity, since by the angle of the cylinders the truck is almost entirely relieved, while by being inclined the whole weight is thrown back on the drivers. It will therefore be seen that while on a level the truck sustains a small portion of weight, sufficient to give it firmness as a pilot, and when pulling upgrade the whole weight is thrown upon the drivers, and becomes available for purpose of adhesion. This feature in my improvement I deem of the greatest practical importance.

There are many advantages gained by my improved locomotive, but which are not consequent alone to the improvement which I claim, and need not be here set forth.

Having now fully described my invention, I do not wish to be understood as confining myself to any particular number of wheels, to any particular construction of truck, to having any particular pair or pairs of the drivers flanged, or to any exact detail of construction; neither do I wish to be understood as claiming either the use of the free-vibrating truck, the augmentation of the number of drivers, or the combination of driving and guiding wheels; but What I do claim as my improvement, and desire to secure by Letters Patent, is—

The combination of a free-vibrating truck, with six or more driving-wheels, when the front pair of drivers is placed in advance of the center of gravity of the entire engine, substantially as and for the purposes herein set forth.

In testimony whereof I have hereunto set my hand and seal this 4th day of November, 1858.

SEPTIMUS NORRIS. [L. S.]

Witnesses:

JAS. A. NORRIS,

W. W. JEFFERSON.